United States Patent [19]  
Uchida

[11] 4,442,929  
[45] Apr. 17, 1984

[54] HYDRAULIC CLUTCH
[75] Inventor: Shinobu Uchida, Hirakata, Japan
[73] Assignee: Kabushiki Kaisha Daikin Seisakusho, Osaka, Japan
[21] Appl. No.: 372,007
[22] Filed: Apr. 26, 1982
[30] Foreign Application Priority Data Apr. 30, 1981 [JP] Japan .............................. 56-63975[U]

[51] Int. Cl.³ .............................................. F16D 25/06
[52] U.S. Cl. .................................. 192/52; 192/85 AA; 192/109 F; 188/366; 188/72.4; 91/401
[58] Field of Search .................. 192/52, 85 A, 85 AA, 192/106 F, 109 F; 188/264 F, 366, 72.4; 91/401

[56] References Cited  
U.S. PATENT DOCUMENTS 3,602,347 8/1971 Yamaguchi et al. .......... 192/85 AA  
3,647,037 3/1972 Toma ................................ 192/106 F  
3,974,743 8/1976 Ivey .................................. 192/106 F  
4,325,471 4/1982 Schuster ......................... 192/85 AA Primary Examiner—Rodney H. Bonck  
Assistant Examiner—James J. Merek  
Attorney, Agent, or Firm—Armstrong, Nikaido, Marmelstein & Kubovcik

[57] ABSTRACT

The present invention discloses a hydraulic clutch comprising friction plates; a hydraulic piston for pressing the friction plates; a pair of annular protrusions respectively formed at radially outer portion and relatively inner portion of the piston with an annular space therebetween, said protrusions being designed to press the adjacent friction plate; an oil passage formed in the piston through which the annular space is connected to a pressure chamber at the back of the piston; a check valve arranged in the oil passage, said valve including a ball forced to close toward the friction plates and partially projecting beyond the protrusions toward the friction plates; an accumulation chamber formed in the piston and connected to the annular space; and a drain means connected to a space in which the friction plates are arranged.

3 Claims, 2 Drawing Figures

HYDRAULIC CLUTCH

BACKGROUND OF THE INVENTION

The present invention relates to a hydraulic clutch having a modulation mechanism and applicable to industrial machines, construction machines, ships and others.

A modulation mechanism has been used for slowly engaging a hydraulic clutch. Conventionally, a valve mechanism has been used as the modulation mechanism, and a few types of the modulation mechanisms have employed spring mechanisms. However, in the former, a valve such as pressure increasing type, accumulator type, variable restrictor type, selective restrictor type or others is arranged in an external hydraulic line connected to the clutch, which complicates constructions and causes increase of cost. In the latter, such construction is employed that a belleville spring is arranged in the clutch, or that a friction plate is shaped conical and has elasticity, or other. However, in any of the constructions, since elastical deformation is limited, and enough deformation is hard to obtain, desirable modulation characteristic is hard to obtain. Also, wear changes the characteristic.

Accordingly it is an object of the invention to provide an improved hydrauric clutch, overcoming the above-noted disadvantages, wherein a modulation mechanism of accumlation type is arranged in a hydraulic piston for pushing and pressing friction plates.

Other and further objects, features and advantages of the invention will appear more fully from the following description of the preferred embodiments of the invention.

DETAILED DESCRIPTION OF THE PREFERRED EMBODIMENT

Figure 1:
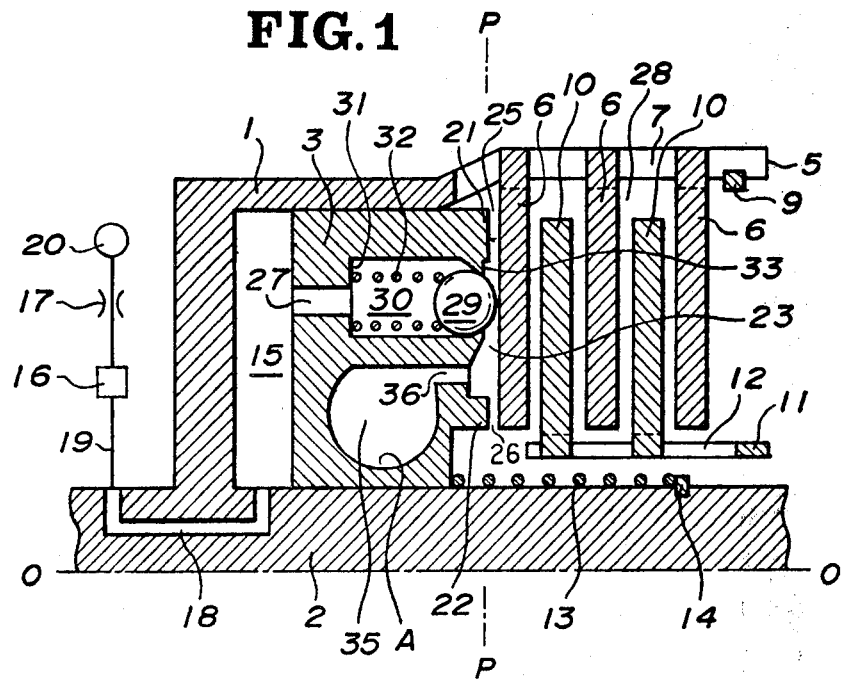
FIG. 1 is a schematic partial sectional view of a clutch according to the invention.

Referring to FIG. 1, a cylinder 1 is formed integrally with and radially outside a clutch input shaft 2. An annular piston 3 is fitted between the cylinder 1 and the shaft 2. A line O—O indicates a clutch center. A cylindrical portion 5 of the cylinder 1 extends to the right in FIG. 1 beyond the piston 3. The extended portion 5 is provided with slits 7 parallel to the center line O—O, in which radial protrusions or claws of annular friction plates 6 (drive plates) slidably engage. A stopper 9 for the friction plates 6 is arranged at the end of the extended portion 5. Annular friction plates 10 (driven plates) are arranged respectively between the adjacent friction plates 6. The friction plates 10 have radial protrusions at their inner peripheries, which slidably engage into slits 12 formed at a cylindrical output shaft 11. The slits 12 are parallel to the center line O—O. A compressive coil spring 13 is arranged between the output shaft 11 and the input shaft 2. The left end in FIG. 1 of the spring 13 is pressed to a radially inner portion of the piston 3. The right end of the spring 13 is pressed to an annular spring seat 14 engaged into a groove of the input shaft 2. An annular pressure chamber 15 is formed between the end wall of the cylinder 1 and the back of the piston 3. The chamber 15 is connected to an oil hydraulic pump 20 through an oil passage 18 formed in the input shaft 2 and an external oil line 19 in which a manual selector valve 16 (direction control valve) and restrictor 17 (or orifice) are provided. The pump 20 is arranged to be driven by an engine (not shown) of a forklift or others.

The face of the piston 3 faced to the friction plates 6 is provided with annular protrusions 21 and 22 projecting rightward in FIG. 1. The protrusion 21 is formed at a radially outer portion of the piston 3. The protrusion 22 is positioned at a radially inner portion of the piston 3. An annular space 23 is formed between both protrusions 21 and 22. In the position shown in FIG. 1, both protrusions 21 and 22 are apart from the adjacent friction plate 6 with spaces 25 and 26 therebetween respectively, so that the space 23 is connected through the spaces 25 and 26 to external spaces including a space 28 in which the friction plates 6 and 10 are arranged. End faces of the protrusions 21 and 22 are aligned on a same plane P—P perpendicular to the center line O—O. Therefore, when the piston 3 moves rightward in FIG. 1 as detailed hereinafter, both protrusions 21 and 22 contact the friction plate 6 and close the spaces 25 and 26.

The piston 3 is provided with one or a few oil passage 27 substantially parallel to the center line O—O. The passage 27 connects the chamber 15 to the space 23. A portion of the passage 27 adjacent to the space 23 has a large diameter and forms a chamber 30 in which a ball 29 for a check valve is arranged. The inner peripheral surface of the chamber 30 continues to the inner peripheral surface of the passage 27 with an annular stepped surface 31 therebetween. A compressive coil spring 32 parallel to the center line O—O is arranged between the stepped surface 31 and the ball 29. An annular valve seat 33, which is radially inward flanged portion, is provided at the end of the chamber 30 adjacent to the space 23. In the valve closed position shown in FIG. 1, the ball 29 is seated on the valve seat 33, and partially projects beyond the ends (P—P) of the protrusions 21 and 22 toward the friction plates 6.

A pressure accumulation chamber 35 having a large capacity is formed annularly in the piston 3. The chamber 35 is positioned radially inside the chamber 30, and is connected to the space 23 through a narrow passage 36, which opens to a radially outer portion of the chamber 35.

Figure 2:
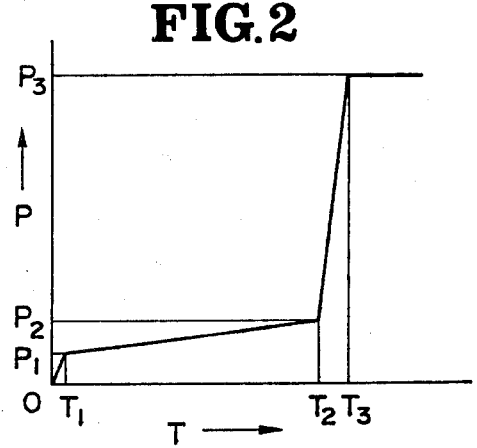
FIG. 2 is a graph showing a clutch hydraulic pressure characteristic.

The operation is as follows. In the clutch engaging operation, the selector valve 16 is switched to the engaging direction, and oil is introduced from the pump 20 to the chamber 15 through the line 19 and the passages 18. Immediately after the switching, the ball 29 is still seated on the valve seat 33, therefore, as shown in FIG. 2, a clutch oil pressure P in the chamber 15 increases to a low value of P1 in a short time (O-T1), and the piston 3 starts to rapidly move toward the friction plates 6. By this initial movement, the protrusions 21 and 22 press the adjacent friction plate 6, so that the friction plates 6 and 10 start to be pressed to each other. Thus, the clutch starts to be engaged in initial half engaged condition. At substantially same time as the above operation, the ball 29 is pressed back by the friction plate 6 toward the chamber 15 and leaves the seat 33, thus, the check valve opens, and some of the oil in the chamber 15 flows into the space 23 through the passage 27 and a space around the ball 29. Before the oil flows into the space 23, the protrusion 21 and 23 have contacted the friction plate 6 and have closed the spaces 25 and 26. Therefore, the oil flowed into the space 23 does not flow out to the space 28 and the other external spaces, and flows through the passage 36 into the chamber 35 which has been empty as detailed hereinafter. As stated above, since some of the oil supplied to the chamber 15 flows into the chamber 35 through the passage 27 and the space 23, the hydraulic pressure in the chamber 15 slowly increases, as shown in FIG. 2, from said low value of P1 to rather high value of P2. Therefore, the pressure by the piston 3 against the friction plates 6 and 10 slowly increases, and the clutch, which is in half engaged condition, is smoothly engaged without any shock.

When the pressure P and the time T reach the value of P2 and the time of T2, and the half engaged condition nearly finishes, the oil fills the space 23 and the chamber 35, so that the oil does not flow out from the chamber 15 thereafter. Therefore, the pressure in the chamber 15 suddenly increases, thus, the piston 3 rapidly presses the friction plates 6 and 10 to be full engaged condition. Therefore, undesirable slip, which may cause wear, does not occur between the friction plates 6 and 10 after the end of the half engaged condition (T2-T3).

In disengaging operation of the clutch, the selector valve 16 is switched reversely, and the oil in the chamber 15 is rapidly released to a drain passage (not shown) through the passages 18, the line 19 and the valve 16, so that the spring 13 pushes back and returns the piston 3 toward the chamber 15, and the pressure between the piston 3 and the friction plates 6 and 10 is released. After the protrusions 21 and 22 leave the friction plate 6, the ball 29 is not pressed by the friction plate 6 any more, and is seated on the valve seat 33, thus the clutch returns to the initial condition from which next engaging operation can start. In the initial condition, the oil has flowed out from the space 23 and the chamber 35 as detailed below, and the space 23 and the chamber 35 are empty, so that they can function again in next operation. Namely, when the spaces 25 and 26 are reformed between the protrusions 21 and 22 and the friction plate 6 in the disengaging operation, the oil in the space 23 flows out by centrifugal force to the space 28 and the other external space mainly through the space 25, and further flows from the external space 28 to a drain passage (not shown). The oil in the chamber 35 is pushed out to the space 23 by compressed air remained in a radially inner portion A of the chamber 35, and then flows out to the drain passage through said spaces. The above compressed air is formed during the last engaging operation. More concretely, in the last operation, the oil flowed from the space 23 through the passage 36 to the radially outer portion of the chamber 35, and enclosed the air in the radially inner portion A of the chamber 35. The air was compressed with the inflow and the pressure increase of the oil, and remains as the compressed small air in the inner portion A when the clutch is fully engaged. When the clutch is disengaged, and the oil pressure is released, the air expands and discharges the oil from the chamber 35. Some of the oil flows out from the chamber 35 by the centrifugal force and vibration. Thus, the space 23 and the chamber 35 become empty when the clutch is disengaged, and thereby, the intended hydraulic pressure characteristic can be obtained by the inflow of the oil to the space 23 and the chamber 35 also in the next engaging operation.

According to the invention, as stated hereinbefore, such modulation mechanism is provided interiorly in the clutch that the oil passage 27 connected to the pressure chamber 15, the check valve including the ball 29 and the accumulation chamber 35 are formed in the piston 3, and that the space 23 connecting the chamber 35 to the passage 27 is formed between the piston 3 and the friction plate 6. Therefore, the construction can be simplified, and the cost can be reduced in comparison with the conventional modulation mechanism including modulation valve arranged in the external oil line. Since, the modulation mechanism of the invention is of pressure accumulation type (hydraulic type), the intended characteristic including slow pressure increasing rate can be obtained in comparison with the conventional mechanism including the belleville spring or the like. Although deviation of the characteristic has been caused by the wear of the spring in the conventional mechanism, the deviation by the wear does not occur in the mechanism of the invention, and the shock can reliably be prevented during the engaging operation. Since the ball 29 is designed to be pushed by the friction plate 6, the start of the opening of the check valve substantially coincides with the start of the clutch engaging, so that the desirable hydraulic characteristic can be obtained in the engaging operation.

Although, in the embodiment in FIG. 1, the chamber 35 is connected to the space 23 through the narrow passage 36 which opens to the radially outer portion of the chamber 35, these construction may be modified if the oil in the chamber 35 can be discharged by the compressed air, the centrifugal force or the vibration. For example, the chamber 35 may be connected directly to the space 23 through a wide opening.

Although the invention has been described in its preferred form with a certain degree of particularity, it is understood that the present disclosure of the preferred form may been changed in the details of construction and the combination and arrangement of parts may be resorted to without departing from the spirit and scope of the invention as hereinafter claimed.

What is claimed:

1. A hydraulic clutch comprising friction plates; a hydraulic piston for pressing the friction plates; a pair of annular protrusion respectively formed at radially outer and relatively inner portions of the piston with an annular space therebetween, said protrusions being designed to press the adjacent friction plate; an oil passage formed in the piston through which the annular space is connected to a pressure chamber at the back of the piston; a check valve arranged in the oil passage, said check valve including a ball forced to close toward the friction plates and partially projecting beyond the protrusions toward the friction plates and an accumulation chamber formed in the piston and connected to the annular space.

2. A hydraulic clutch of claim 1 wherein a radially outer portion of the accumulation chamber is connected to the annular space through a narrow passage, so that the oil flowing into the accumulation chamber may enclose and compress air in a radially inner portion of the accumulation chamber.

3. A hydraulic clutch of claim 1 wherein the check valve has a spring for forcing the ball, and the force applied to the ball by the spring corresponds to pressure between the friction plates which start to be engaged together.

* * * * *